(12) United States Patent
Freyermuth

(10) Patent No.: US 10,520,003 B2
(45) Date of Patent: Dec. 31, 2019

(54) SCREW SUITABLE FOR HOUSINGS

(71) Applicant: Eaton Electrical IP GmbH & Co. KG, Schoenefeld (DE)

(72) Inventor: Thomas Freyermuth, Kalenborn (DE)

(73) Assignee: EATON INTELLIGENT POWER LIMITED, Dublin (IE)

( * ) Notice: Subject to any disclaimer, the term of this patent is extended or adjusted under 35 U.S.C. 154(b) by 154 days.

(21) Appl. No.: 15/534,493

(22) PCT Filed: Dec. 8, 2015

(86) PCT No.: PCT/EP2015/078948
§ 371 (c)(1),
(2) Date: Jun. 9, 2017

(87) PCT Pub. No.: WO2016/091863
PCT Pub. Date: Jun. 16, 2016

(65) Prior Publication Data
US 2017/0343030 A1 Nov. 30, 2017

(30) Foreign Application Priority Data
Dec. 12, 2014 (DE) .......... 10 2014 118 513

(51) Int. Cl.
*F16B 35/04* (2006.01)
*F16B 33/00* (2006.01)

(52) U.S. Cl.
CPC .......... *F16B 33/004* (2013.01); *F16B 35/048* (2013.01)

(58) Field of Classification Search
CPC .............. F16B 33/004; F16B 35/048
USPC .......... 411/542, 369, 371, 1, 371.1
See application file for complete search history.

(56) References Cited

U.S. PATENT DOCUMENTS

| | | | | |
|---|---|---|---|---|
| 2,995,057 A * | 8/1961 | Nenzell | ................. | F16B 33/004 251/332 |
| 4,621,963 A * | 11/1986 | Reinwall | ............... | F16B 5/0275 411/369 |
| 4,630,984 A * | 12/1986 | Reinwall | ............... | E04D 3/3603 411/368 |
| 5,534,032 A * | 7/1996 | Hodorek | ............ | A61B 17/8047 411/369 |
| 7,207,248 B2 * | 4/2007 | Panasik | ............... | F16B 23/0092 411/402 |
| 8,651,413 B2 * | 2/2014 | Kashiwagi | ............. | B64D 45/02 204/196.18 |

(Continued)

FOREIGN PATENT DOCUMENTS

CN 203463463 U 3/2014
CN 203931713 U 11/2014
(Continued)

*Primary Examiner* — Flemming Saether
(74) *Attorney, Agent, or Firm* — Leydig, Voit & Mayer, Ltd.

(57) ABSTRACT

A screw, in particular for housings, has an elongated section provided at least in parts with a thread, and a screw head. A cone-shape section may be arranged between the screw head and the elongated section, wherein the point of the conical section connects to one end of the elongated section, and the underside of the screw head may be arranged opposite the base surface of the conical section, and a groove for accommodating a seal may be provided between the underside of the screw head and the base surface of the conical section.

13 Claims, 3 Drawing Sheets

(56) References Cited

U.S. PATENT DOCUMENTS

| | | | |
|---|---|---|---|
| 8,905,697 B2 * | 12/2014 | Gong | .................... E04D 3/3606 411/371.1 |
| 2007/0098520 A1 | 5/2007 | Schraer | |
| 2010/0143074 A1 | 6/2010 | Sumiya et al. | |

FOREIGN PATENT DOCUMENTS

| | | |
|---|---|---|
| DE | 202004004893 U1 | 8/2005 |
| DE | 102006020630 A1 | 11/2007 |
| DE | 202007014325 U1 | 12/2007 |
| DE | 202009003471 U1 | 5/2009 |
| DE | 102009044746 A1 | 6/2010 |
| EP | 0824173 A1 | 2/1998 |
| EP | 1859957 A2 | 11/2007 |
| JP | 2014202229 A | 10/2014 |

\* cited by examiner

SCREW SUITABLE FOR HOUSINGS

CROSS-REFERENCE TO RELATED APPLICATIONS

This application is a U.S. national stage application under 35 U.S.C. § 371 of International Application No. PCT/EP2015/078948, filed on Dec. 8, 2015, and claims benefit to German Patent Application No. DE 10 2014 118 513.7, filed on Dec. 12, 2014. The International Application was published in German on Jun. 16, 2016, as WO 2016/091863 A1 under PCT Article 21(2).

FIELD

The invention relates to a screw that is provided in particular for housings such as switching appliance housings that are used in hygiene areas.

BACKGROUND

Housings for switching appliances, in particular for command and signal units, generally consist of plastics material and are composed of an upper and a lower part which are rigidly interconnected by fixing screws.

FIG. 3 shows an example of a switching appliance housing 100 composed of an upper part 102 having openings 103 for operating and switching buttons and a lower part 104. Four screws 106 having lens countersunk heads and plastics material threads fix the upper part 102 to the lower part 104. To achieve as high a level of protection as possible, a seal 108 may be provided between the upper and the lower part. In this case, the sealing material sits in the upper part 102 and the shape thereof extends below the countersunk head of each of the screws 106, in such a way that when the screws 106 are tightened the seal 108 seals the screws 106 off from the housing.

Because the screw head sits somewhat lowered in the counterbore in the housing upper part 102, and is additionally somewhat smaller than the counterbore depression of the upper part 102 due to the required tolerance of the head, there is a gap, in which deposits such as dirt, cleaning agents or even bacteria may collect, between the screw head and the upper housing part. Likewise, deposits of this type may collect in the slits serving as a tool interface in screw heads.

In particular if switching appliance housings of this type are used in hygiene areas, for example in production plants for pharmaceuticals or foodstuffs, deposits of this type are a serious problem, in particular if they are released and enter processed foodstuffs or pharmaceuticals. The cleaning of gaps or depressions of this type in housings is also problematic.

Therefore, gaps and depressions in housings such as switching appliance housings generally constitute a constant risk of contamination in hygiene areas for the products manufactured under hygiene rules.

German laid-open publication DE 10 2009 044 746 A1 describes a screw comprising a cylindrical portion or shaft arranged between a screw head and a thread portion, having a greater diameter than the thread portion, and having approximately centrally a groove for receiving a seal.

US laid-open publication US 2007/0098520 A1 describes a bolt for impressing in a metal sheet, which has a groove arranged between the lower face of the bolt head and an annular projection. For sealing a hole into which the bolt is to be inserted, the bolt head is coated with a sealing material such as epoxy resin. Recesses may also be provided on the lower face of the bolt head for receiving sealing material.

German utility model specification DE 20 2007 014 325 U1 describes a mounting arrangement comprising a resilient ring, for example an O-ring, which is inserted into an annular groove that is introduced into the shaft of a screw of the arrangement approximately centrally in the longitudinal extension of the shaft.

SUMMARY

An aspect of the invention provides a screw, comprising: an elongate portion including a thread at least in part; a screw head; a conically shaped portion, arranged between the screw head and the elongate portion, a tip of the conical portion being connected to an end of the elongate portion, and a lower face of the screw head being arranged opposite a base surface of the conical portion; and a groove configured to receive a seal, provided between the lower face of the screw head and the base surface of the conical portion.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
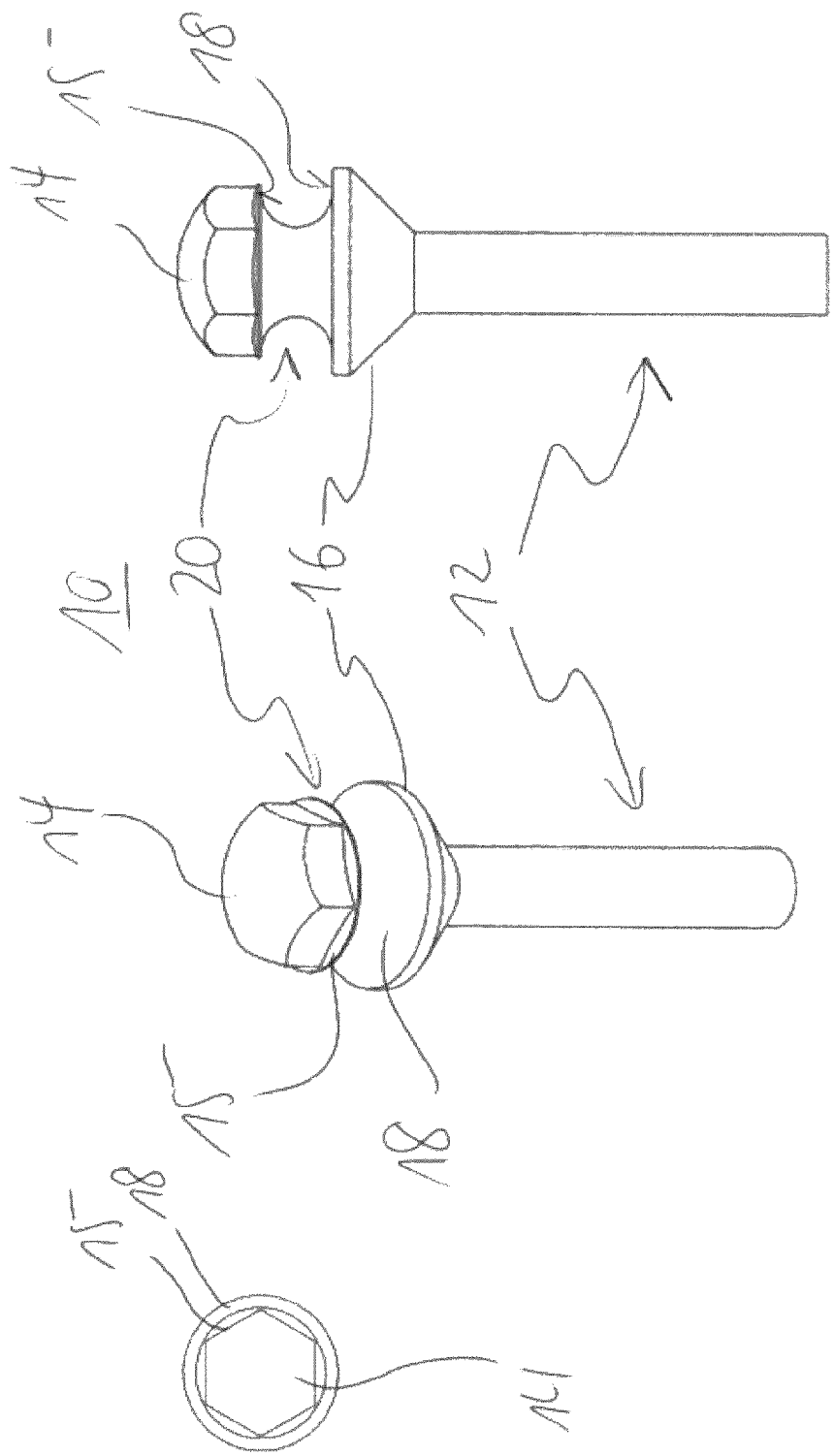
FIG. 1 three different views of an embodiment of a screw for a switching appliance housing according to the invention.

An aspect of the present invention provides a screw that is provided in particular for housings such as switching appliance housings that are used in hygiene areas and that provides as few deposition options as possible for particles when screwed in and is additionally easy to clean.

An embodiment of the present invention provides a screw with a mounting option provided high up, in other words close to the screw head, for a seal, in such a way that there can be no gap, or at least only a very small gap, between the screw, more precisely the screw head, and a housing part when the screw is screwed in. In an embodiment according to the invention a countersunk head of a screw is modified in such a way that a groove for mounting a seal is inserted between the countersunk portion and the actual screw head portion. As a result, the seal is shifted closer to the tip of the screw head as seen from the thread by comparison with the conventional screw types for housing screw connection, in such a way that the formation of in particular a deep gap between the screw head and a housing part is prevented, and thus the risk of deposits in this deep gap is prevented or at least reduced.

An embodiment of the invention relates to a screw, in particular for housings, for example switching appliance housings, that has an elongate portion, provided with a thread at least in part, and a screw head. According to the invention, a conically shaped portion is arranged between the screw head and the elongate portion. The tip of the conical portion is connected to an end of the elongate portion, and the lower face of the screw head is arranged opposite the base surface of the conical portion. A groove for receiving a seal is provided between the lower face of the screw head and the base surface of the conical portion. As a result of this constructional configuration of the screw, a seal is placed as close as possible to the screw head, specifically directly below it, in such a way that, when the screw is screwed in, sealing between the lower face of the screw head and a housing is brought about virtually directly below the screw head, and thus no gaps and depressions remain in the housing for deposits. A screw of this type may be configured in such a way that it fits into the same installation space as a conventional or standard countersunk head screw, but has the advantages of no, or at least less, gap formation between the screw head and the wall of the screw-in hole, of the accompanying increased ease of cleaning, and of the use of conventional tools. As a result of the seal being positioned closer to the upper screw head face than in conventional screws, said seal is also positioned closer to a surface of the part to be screw-connected, preventing a gap being formed between the screw head and the part, in particular the surface thereof and the wall of the screw-in hole, and resulting in a virtually closed surface from the screw head to the surface of the part to be screw-connected, largely without interruption by gaps.

An O-ring may for example be used as a seal. The O-ring may be made of a hygiene-appropriate material such as a hygiene-conformant elastomer, meaning that substances to be processed cannot be contaminated by the O-ring itself.

The screw head and the conically shaped portion may be formed in a single piece and consist of a metal. For example, a high-grade steel that meets particular hygiene requirements may be used as the metal.

The screw may also be formed entirely in a single piece and consist of a metal, in particular a food-conformant high-grade steel in the case of use in the food sector.

The thread of the elongate portion may have a thread shape particularly suitable for plastics material, in particular a thread shape particularly suitable for screwing into plastics material, possibly corresponding for example to the same thread shape used in the standard screws already used nowadays for plastics material. Thus, in plastics material housings having standard screw-in holes, no alteration is required, and the screw according to the invention can be used instead of a conventional screw.

The screw head may be formed as an externally polygonal head, in particular as an externally hexagonal head, having exclusively rounded edges and a curved head surface. As a result, further locations for undesirable accumulations of particles as for example in screw heads having slits can be prevented. Moreover, from the screw head to the surface of a part to be screwed in, a surface virtually without sharp edges can be obtained, meaning that contaminations of substances to be processed with which the screw head may come into contact can be prevented.

The groove can be dimensioned in such a way that at most one fourth of the surface of the seal to be received is exposed. As a result, as small an action area as possible is provided for foreign substances such as cleaning agents or environmental influences that might damage, for example decompose, the seal.

The dimensioning and shaping of the groove may be adapted to a seal to be received in such a way that, depending on the hardness of the sealing material, the contact pressure exerted on the seal when the screw has been screwed into a screw opening only compresses the seal to an extent where there is no damage to the seal for a predetermined sealing effect.

The conically shaped portion may have an opening angle of approximately 90°.

Further advantages and possible applications of the present invention may be derived from the following description in connection with the embodiments shown in the drawings.

The terms and associated reference numerals used in the list of reference numerals below are used in the description, claims, abstract and drawings.

In the following description, like, functionally equivalent and functionally cohesive elements may be provided with like reference numerals. In the following, absolute values are given merely by way of example and should not be interpreted as limiting the invention.

The central drawing of FIG. 1 is a perspective view of a screw 10 according to the invention comprising a plastics material thread 12, a 90° countersunk part 16, an externally hexagonal head 14 as a tool interface, and a groove 20, provided between the circular base surface 18 of the countersunk part 16 and the circularly shaped lower face 15 of the externally hexagonal head 14, for receiving and mounting an O-ring (O-ring groove). The left-hand drawing of FIG. 1 is a plan view of the externally hexagonal head 14. In this drawing, it can clearly be seen that the diameter of the base surface 18 of the countersunk part 16 is slightly greater than the diameter of the lower face 15 of the head 14. Accordingly, the hole diameter of a switching appliance housing has to correspond at least to the diameter of the base surface 18, but is typically somewhat larger because of tolerances. The right-hand drawing of FIG. 1 is a side view also of the screw 10.

Figure 2:
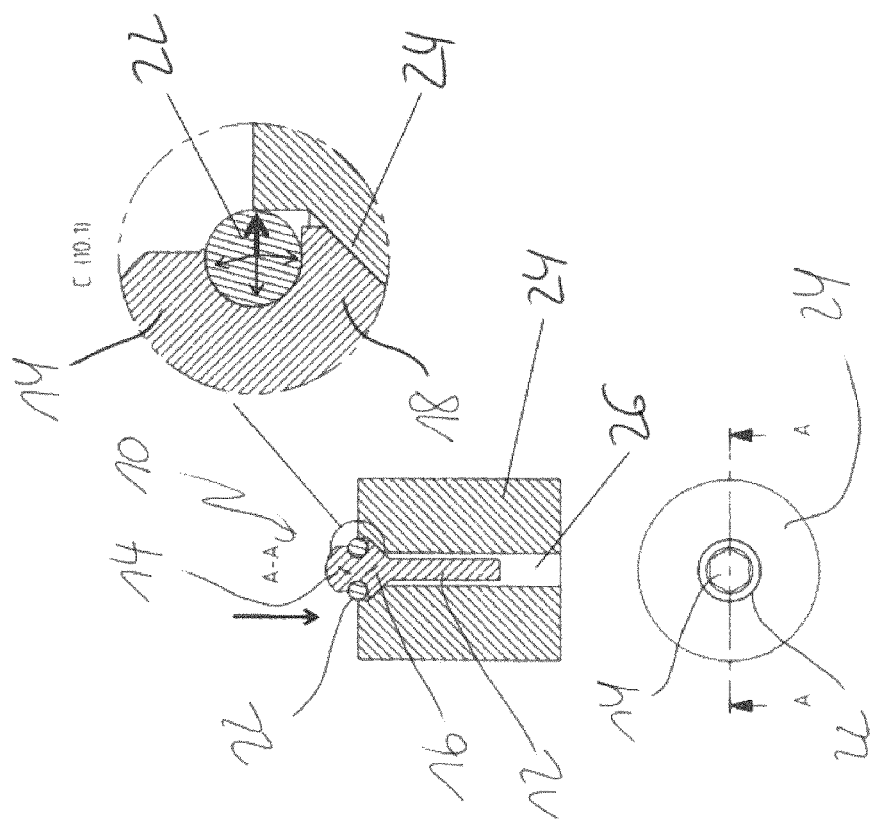
FIG. 2 a sectional drawing of the screw of FIG. 1 when it has been screwed in along with a detail view of the O-ring seal of the screw.
Figure 3:
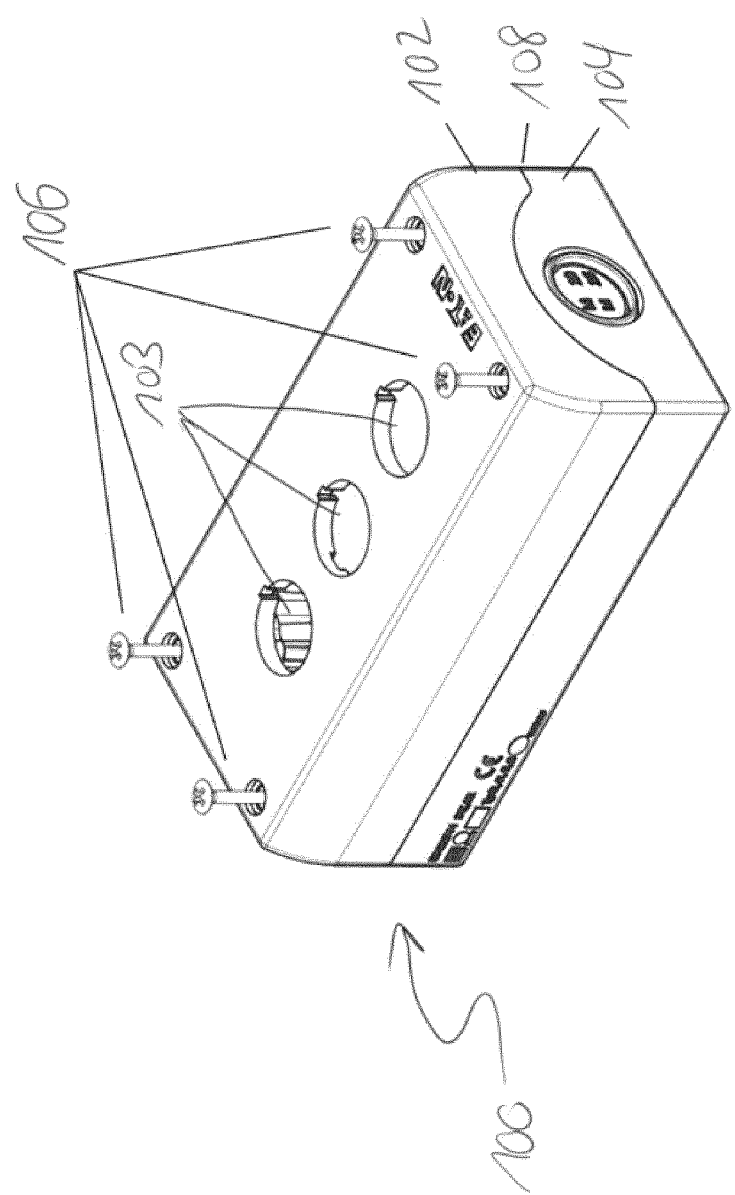
FIG. 3 a switching appliance housing comprising a screw connection having conventional countersunk screws.

FIG. 2 provides a sectional view along the line A-A of the screw 10 shown in a plan view in the drawing below in FIG. 2, when it has been screwed into a countersunk head hole 26 in a housing part 24. The 90° countersunk part 16 sits in the countersunk part portion of the counterbore in the housing part 24, and thus fixes a rigid position of the screw 10 in the housing part 24. This likewise results in a fixed position in relation to the housing part 24 for the O-ring 22, and the pressure applied to the elastomer of the O-ring 22 is thus controlled or defined, as required for example by a standard.

In the detail view on the top right of FIG. 2, the pressure exerted on the elastomer of the O-ring 22 is shown, said pressure being defined in particular by the position of the groove between the head 14 and the countersunk head 18 and the configuration of the groove and the O-ring 22, and being able to be sized appropriately so as to achieve a desired sealing effect. Unlike in otherwise conventional sealing, in this case the primary sealing force acts in a direction of approximately 90° to the screw-in direction of the screw 10, and is therefore substantially independent of the tightening direction of the screw 10. As a result, the compression of the seal of the O-ring 22 can be limited, and damage to the elastomer structure of the O-ring 22, which can lead to a loss of contact pressure and thus of sealing effect, can thus be prevented. The geometric configuration and size of the groove 20 (FIG. 1) for the O-ring 22 and the size of the O-ring 22 can be selected in such a way that as good a sealing as possible is achieved independent of the hardness of the elastomer of the O-ring 22. For example, the configuration of the groove 20 and the O-ring 22 may be selected in such a way that in a rubber O-ring having 70° Shore hardness the O-ring is compressed by 15% when the screw has been screwed in, since according to standards compression of this type can seal reliably against bacteria.

Because of its similarity to conventional countersunk head screws, the screw according to the invention can replace them if the counterbore in a housing part and/or the dimensions of the countersunk part and groove of the screw according to the invention are such that a sealing function is provided, in other words an O-ring mounted in the groove of the screw can seal off the surface counterbore edge of the housing part.

The head height of the externally hexagonal head, which can in principle be configured as standard from the mold size thereof, may be slightly smaller than the standard head height; in particular, the head may be configured flatter, in such a way that the head does not protrude so far from a housing, but still offers a sufficient application and action point for a tool for screwing in. The rounded head surface—see right-hand drawing of FIG. 1—additionally facilitates and promotes the cleaning of the head of the screw screwed into a housing.

Since in the screw according to the invention the sealing points are located as close as possible to the outer region of parts to be fixed, in particular of housing parts, it can be provided that a screw-connected housing is acceptably cleanable even in the region of the screw-connection, largely without deposition options for particles of dirt.

Further comments on possible embodiments of the screw according to the invention follow. The threaded part of the screw may be formed metrically or for plastics material. The screw according to the invention may be configured in such a way that it fits into the same installation space as a conventional standard screw and can increase the level of protection of the housing at the screw-connection point, as well as making simple replacement of conventional standard screws possible. The screw head may meet all hygiene requirements of the field of application as set out in a standard, and for this purpose be configured in such a way that it has no gaps, makes ease of cleaning possible, and has a matching interface for the O-ring seal and for a fastening tool (key, socket). The installation of the O-ring is configured in such a way that all sealing points are positioned close to the surface of the (housing) part to be screw-connected, resulting in a virtually closed surface from the screw head to the surface of the (housing) part, without interruption by gaps and sharp edges. The compression of the O-ring seal is limited, and is independent of the tightening force, since the primary sealing force acts transversely to the screw-in direction at approximately 90°. In every installation position, it is possible for liquids to drain off, and ease of cleaning is provided. There is no restriction on the installation position. The materials used may be selected in such a way that they are permitted for the intended field of use, for example for the foodstuffs sector. For example, the screw may be made in a single piece from a suitable high-grade steel, and the seal, in particular an O-ring, may be made of a conformant elastomer. Grease for further sealing is not required. The outwardly exposed part of the seal may end up relatively small, and only constitute one fourth of the total sealing surface, meaning that as small an action area as possible is provided for foreign substances such as cleaning agents or environmental influences. The part of the screw protruding from the surface of the (housing) part to be screw-connected can be kept so small in dimensions that injuries can be prevented as a result, but the required tightening force for screwing in can still be transmitted well.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

REFERENCE NUMERALS

10 Screw
12 Plastics material thread
14 Externally hexagonal head
15 Circular lower face of the externally hexagonal head 14
16 90° countersunk part
18 Circular base surface of the countersunk part 16
20 Groove for receiving an O-ring seal
22 O-ring
24 Housing part
26 Countersunk head hole

The invention claimed is:

1. A screw, comprising:
an elongate portion including a thread at least in part;
a screw head comprising an upper portion and a lower face;
a conically shaped portion having a tip and a base surface, the conically shaped portion being arranged between the screw head and the elongate portion, the tip being connected to an end of the elongate portion, and the base surface being arranged opposite the lower face of the screw head; and
a groove configured to receive a seal, the groove being delimited by the lower face of the screw head, the base surface of the conically shaped portion, and a continuously curved surface extending from an outermost circumference of the upper portion to the base surface such that, in a screwed-in state of the screw, the lower face of the screw head is configured to be disposed directly above and contacting the seal.

2. The screw of claim 1, wherein the screw head and the conically shaped portion are formed in a single piece and include a metal.

3. The screw of claim 1, formed in a single piece and including a metal.

4. The screw of claim 1, wherein the thread of the elongate portion includes a thread shape suitable for plastic.

5. The screw of claim 1, wherein the screw head comprises an externally polygonal head including exclusively rounded edges and a curved head surface.

6. The screw of claim 1, wherein the conically shaped portion includes an opening angle of approximately 90°.

7. The screw of claim 1, made of materials that meet predetermined hygiene requirements.

8. The screw of claim 1, configured for a housing.

9. The screw of claim 1, comprising a high-grade steel, a hygiene-conformant elastomer, or a combination of these.

10. A system, comprising:
    a seal; and
    a screw, the screw comprising:
        an elongate portion including a thread at least in part;
        a screw head comprising an upper portion and a lower face;
        a conically shaped portion having a tip and a base surface, the conically shaped portion being arranged between the screw head and the elongate portion, the tip being connected to an end of the elongate portion, and the base surface being arranged opposite the lower face of the screw head; and
        a groove configured to receive the seal, the groove being delimited by the lower face of the screw head, the base surface of the conically shaped portion, and a continuously curved surface extending from an outermost circumference of the upper portion to the base surface such that, in a screwed-in state of the screw, the lower face of the screw head is configured to be disposed directly above and contacting the seal.

11. The system of claim 10, wherein the seal comprises an O-ring.

12. The system of claim 10, wherein the groove is dimensioned such that at most one fourth of a surface of the seal to be received is exposed.

13. The system of claim 10, wherein dimensioning and shaping of the groove are adapted to the seal such that, depending on a hardness of a sealing material of the seal, a contact pressure exerted on the seal when the screw when the screw is in the screwed-in state only compresses the seal to an extent where there is no damage to the seal for a predetermined sealing effect.

* * * * *